Patented Jan. 9, 1934

1,942,800

UNITED STATES PATENT OFFICE 1,942,800

SODIUM PARA-PHENYLPHENATE AND METHOD OF MAKING SAME

Edgar C. Britton, Midland, Mich., assignor to The Dow Chemical Company, Midland, Mich., a corporation of Michigan No Drawing. Application November 6, 1929
Serial No. 405,292

4 Claims. (Cl. 260—154)

The present invention relates to a new compound, namely the sodium salt of para-phenylphenol, and to a method of preparing and isolating the same. The compound in question, as far as I am aware, has not previously been prepared or isolated in solid form. My invention, then, consists of the aforesaid new composition of matter, the following description setting forth methods of preparing the same and giving certain physical properties thereof whereby such compound may be characterized and identified.

Sodium para-phenylphenate may be prepared by dissolving the corresponding free phenol in an excess of an aqueous solution of sodium hydroxide, preferably with warming, the concentration of the solution being such that the batch may be handled and not become too thick with crystals on cooling. Upon cooling the so obtained solution sufficiently, crystals of product are formed which may then be isolated by filtering, centrifuging, or otherwise handling the batch.

The sodium salt of para-phenylphenol may also be prepared in other ways, such as by the action of sodium on the free phenol, or by reaction of the free phenol and sodium hydroxide in alcoholic solution, or other solvent.

A preferred manner by which my invention may be used is illustrated as follows. 260 grams of para-phenylphenol were reacted with 67 grams sodium hydroxide in 16 per cent aqueous solution. The reaction mixture was warmed to 85° C., diluted with 250 cc. water, cooled in an ice-bath, and filtered, whereupon 250 grams of crystals of the sodium salt were obtained.

The white crystals of sodium para-phenylphenate, which are needle shaped and contain one molecule of water of crystallization, may be dehydrated by heating to about 105° C. The dehydrated salt again becomes hydrated on cooling of same in presence of water vapor. The salt suffers slow decomposition upon heating in air to approximately 105° C., which decomposition upon further heating of said salt to about 125° C., becomes fairly rapid. The sodium salt is soluble in water, forming an aqueous solution which may partially hydrolyze into the free phenol and free alkali.

A sample of sodium para-phenylphenate, prepared by dissolving the free phenol in hot 10 per cent excess sodium hydroxide (aqueous), cooling to form crystals and separating the latter from liquid by centrifuging without washing, analyzed to contain 11.3 per cent sodium, the theoretical value being 10.9 per cent sodium in material containing one molecule of water of crystallization.

Sodium para-phenylphenate is useful for the preparation of disinfecting agents, insecticides, soaps, etc. as well as being an intermediate product for the preparation of various medicinal compounds, forming phenylated compounds, such as phenyl aspirin, phenyl salicylates, etc., also for the preparation of resinous condensation products, and metal salts other than the sodium salt.

Other modes of applying the principle of my invention may be employed instead of the one explained, change being made as regards the details, provided the step or steps stated by any of the following claims or the equivalent of such be employed.

I therefore particularly point out and distinctly claim as my invention:—

1. As a new compound, sodium para-phenylphenate, in the form of white needle-like crystals, containing water of crystallization.

2. As a new compound, sodium para-phenylphenate, in the form of white needle-like crystals, containing one molecule of water of crystallization and decomposing at a temperature of about 105° C.

3. As a new compound, anhydrous sodium para-phenylphenate, obtainable by dehydrating the hydrated salt, such anhydrous salt undergoing decomposition upon heating at a temperature of about 105° C.

4. As a new product, crystalline sodium para-phenylphenate.

EDGAR C. BRITTON.